(12) United States Patent
Smith et al.

(10) Patent No.: US 11,537,965 B2
(45) Date of Patent: Dec. 27, 2022

(54) METHOD AND SYSTEM FOR TRACKING CONTAINERS

(71) Applicant: Owens-Brockway Glass Container Inc., Perrysburg, OH (US)

(72) Inventors: Roger P. Smith, Perrysburg, OH (US); Chris D. Anderson, Perrysburg, OH (US); Olivier Dangmann, Villefranche-sur-Saone (FR); Anthony R. Caracciolo, Maumee, OH (US); Casey L. Ingle, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 16/988,127

(22) Filed: Aug. 7, 2020

(65) Prior Publication Data

US 2020/0372430 A1 Nov. 26, 2020

Related U.S. Application Data

(62) Division of application No. 14/842,434, filed on Sep. 1, 2015, now Pat. No. 10,776,729.

(51) Int. Cl.
*G06Q 10/06* (2012.01)
*G06Q 30/02* (2012.01)
(Continued)

(52) U.S. Cl.
CPC ... *G06Q 10/06315* (2013.01); *G06F 16/9554* (2019.01); *G06Q 10/08* (2013.01)

(58) Field of Classification Search
CPC .............................. G06Q 10/06; G06Q 30/02
(Continued)

(56) References Cited

U.S. PATENT DOCUMENTS

| 4,829,428 A | 5/1989 | Weitzman et al. |
| 5,473,152 A | 12/1995 | Apter et al. |

(Continued)

FOREIGN PATENT DOCUMENTS

| CN | 102222284 A | 10/2011 |
| CN | 102542341 A | 7/2012 |

(Continued)

OTHER PUBLICATIONS

Argentina Office Action, Serial No. P 16 01 02630, Applicant: Owens-Brockway Glass Container Inc., dated Aug. 8, 2020.
(Continued)

*Primary Examiner* — Nga B Nguyen

(57) ABSTRACT

A method for tracking containers. The method includes manufacturing containers, including forming the containers and serializing them with machine-readable codes. The method further includes using the machine-readable codes to store data associated with the containers, and supplying the containers to a customer. The method still further comprises receiving from the customer, data obtained from customer-readings of the machine-readable codes; and receiving from one or more other locations in a distribution chain in which the containers travel, data obtained from readings of the machine-readable codes at those locations. The method still further comprises comparing the data from the customer-readings and other readings of the machine-readable codes across product brands, product distribution channels, and/or container types, and providing the data to the customer. In at least some embodiments, the method further comprises receiving from the customer a compensation for the containers, for example, a per-refill compensation.

16 Claims, 4 Drawing Sheets

(51) Int. Cl.
*G06F 16/955* (2019.01)
*G06Q 10/08* (2012.01)

(58) Field of Classification Search
USPC ........................................................ 705/7.25
See application file for complete search history.

(56) References Cited

U.S. PATENT DOCUMENTS

| | | | |
|---|---|---|---|
| 5,612,525 A | 3/1997 | Apter et al. | |
| 6,547,137 B1 | 4/2003 | Begelfer et al. | |
| 6,772,944 B2 | 8/2004 | Brown | |
| 6,998,983 B2 | 2/2006 | Charych et al. | |
| 7,642,093 B2 | 1/2010 | Tseung et al. | |
| 7,658,286 B2 | 2/2010 | Murray | |
| 7,667,604 B2 | 2/2010 | Ebert et al. | |
| 7,772,521 B2 | 8/2010 | Smith, Jr. et al. | |
| 7,823,745 B2 | 11/2010 | Esser et al. | |
| 8,020,359 B2 | 9/2011 | Mattos, Jr et al. | |
| 8,142,739 B2 | 3/2012 | Tseung et al. | |
| 8,326,451 B2 | 12/2012 | Schantz et al. | |
| 8,442,876 B1 | 5/2013 | Rogers et al. | |
| 8,550,273 B2 | 10/2013 | Levin et al. | |
| 10,776,729 B2* | 9/2020 | Smith | G06Q 10/06315 |
| 2002/0022968 A1 | 2/2002 | Shimada et al. | |
| 2004/0226994 A1 | 11/2004 | Brown | |
| 2004/0235397 A1 | 11/2004 | Lack | |
| 2005/0038710 A1 | 2/2005 | Zimmerman et al. | |
| 2005/0080679 A1 | 4/2005 | Barton et al. | |
| 2006/0118507 A1 | 6/2006 | Feldman | |
| 2007/0021929 A1 | 1/2007 | Lemmo et al. | |
| 2007/0214055 A1* | 9/2007 | Temko | G07F 5/18 705/22 |
| 2007/0276686 A1 | 11/2007 | Hunscher et al. | |
| 2008/0116105 A1 | 5/2008 | Statham | |
| 2008/0306813 A1 | 12/2008 | Romansky et al. | |
| 2009/0210359 A1 | 8/2009 | Chapman | |
| 2009/0230190 A1 | 9/2009 | Chanez et al. | |
| 2009/0315315 A1 | 12/2009 | Bolouri | |
| 2010/0017276 A1 | 1/2010 | Wolff et al. | |
| 2010/0063887 A1 | 3/2010 | Kranz et al. | |
| 2010/0106515 A1 | 4/2010 | McCoy | |
| 2010/0106521 A1 | 4/2010 | Ashrafzadeh | |
| 2010/0106624 A1* | 4/2010 | Ashrafzadeh | G06Q 10/08 705/28 |
| 2010/0106625 A1 | 4/2010 | McCoy | |
| 2010/0274629 A1 | 10/2010 | Walker et al. | |
| 2011/0041573 A1 | 2/2011 | Giles | |
| 2011/0202481 A1 | 8/2011 | Lang et al. | |
| 2011/0225106 A1 | 9/2011 | Levenstein et al. | |
| 2011/0315765 A1 | 12/2011 | Schantz et al. | |
| 2012/0055993 A1 | 3/2012 | Muller | |
| 2012/0059513 A1* | 3/2012 | Perkins | B67D 1/0406 700/244 |
| 2012/0173412 A1 | 7/2012 | Rosenstein et al. | |
| 2012/0293321 A1* | 11/2012 | Monroe | G16H 20/17 340/539.11 |
| 2013/0026747 A1 | 1/2013 | Key | |
| 2013/0075296 A1 | 3/2013 | Ramsey et al. | |
| 2013/0080458 A1 | 3/2013 | Chatow et al. | |
| 2013/0341228 A1 | 12/2013 | Click et al. | |
| 2014/0076896 A1 | 3/2014 | Aneas | |
| 2014/0116911 A1* | 5/2014 | Bryant | C03C 17/005 206/459.5 |
| 2015/0028110 A1 | 1/2015 | Bryant et al. | |
| 2015/0088620 A1* | 3/2015 | Wittek | G06Q 30/0207 705/14.1 |
| 2015/0232319 A1* | 8/2015 | Wedderburn | B65D 61/00 222/153.14 |
| 2018/0035098 A1 | 2/2018 | Peeters et al. | |

FOREIGN PATENT DOCUMENTS

| | | |
|---|---|---|
| CN | 102663596 A | 9/2012 |
| CN | 102884533 A | 1/2013 |
| DE | 3626775 C1 | 9/1987 |
| DE | 102009007282 A1 | 7/2010 |
| WO | 2007123935 A1 | 11/2007 |
| WO | WO2010009448 A1 | 1/2010 |
| WO | WO2017039935 A1 | 3/2017 |

OTHER PUBLICATIONS

Malaysian Substantive Examination Adverse Report and Search Report, Serial No. PI2018700286, Filing Date: Aug. 4, 1016, Applicant: Owens-Brockway Glass Container Inc., dated Apr. 29, 2021.

Mexican Office Action with English Translation, Serial No. MX/a/2018/002422, Office Action No. 42169, Applicant: Owens-Brockway Glass Container Inc., dated May 11, 2021.

Chilean Office Action with English Translation, Serial No. 2018/00051, Application Date: Feb. 23, 2018, Title: Method and System for Tracking Containers, Applicant: Owens-Brockway Glass Container Inc., dated Jun. 1, 2021.

Chinese 1st Office Action, Application No. 201680050603.X, Applicant: Owens-Brockway Glass Container Inc., Title: Method and System for Tracking Containers, dated Jun. 25, 2021.

"Container Design Study, American Glass Research", https://americanglassresearch.com/testing/container-design-study, copyright 2020 (2pgs).

"Design Evaluation Request Form, American Glass Research", https://americanglassresearch.com/testing/design-study/design-evaluation-request-form, copyright 2020 (2pgs).

"Narrow Neck Press and Blow, Process Technologies Manuel", TW1051/1093, Emhart Glass, 1993 (472 pages).

Argentina Office Action, Serial No. 20160102630, Applicant: Owens-Brockway Glass Container Inc., dated Sep. 29, 2021.

Colombia Office Action, Serial No. NC2021/0011064, Applicant: Owens-Brockway Glass Container Inc., Title: Method and System for Tracking Containers, dated Oct. 15, 2021.

Australian Examination Report No. 1, Australian Application No. 2016317290, Applicant Name: Owens-Brockway Glass Container Inc., dated Apr. 14, 2021.

Peru Office Action with English Translation, Application No. 282-2018/DIN, Applicant: Owens-Brockway Glass Container Inc., Title: Method and System to Track Packaging, dated Apr. 25, 2022.

* cited by examiner

METHOD AND SYSTEM FOR TRACKING CONTAINERS

The present disclosure is directed to containers and, more particularly, to methods and systems for tracking and collecting data about containers.

BACKGROUND AND SUMMARY OF THE DISCLOSURE

Containers may be used to package and supply a variety of different goods including, but not limited to, beverages and other food products packaged in glass or plastic containers, for example, bottles. These containers are designed and intended to travel through a fairly extensive distribution or supply chain. Some containers are reusable in that the container is intended to be reused numerous times, traveling repeatedly through a distribution or supply chain. For instance, a container manufacturer may first supply a container to a customer (e.g., bottler) who then packages its good(s)/product(s) in the container. The container may then be shipped to a point of sale, for example, a retail store, a restaurant, etc., where a consumer or end user may purchase the good. Subsequent to the consumption or use of the good(s) in the container, the empty container may be returned to a return or collection facility, which may then return the container to either the manufacturer or the initial customer (e.g., bottler). Reusable containers may be cleaned and re-filled by a customer (e.g., bottler) or they may be returned to the container manufacturer at such time that the reusable container has reached the end of its useful life; the container manufacturer may re-melt the container. Non-reusable containers may be returned to the container manufacturer for re-melting. Unfortunately, data regarding how a particular container travels through the distribution chain is either unavailable or limited, and as such, is of little use to the container manufacturer, the initial customer of the container, or to other parties.

A general object of the present disclosure, in accordance with one aspect of the disclosure, is to provide a method and system for tracking and collecting data about containers as the containers travel through various points in a distribution chain using permanent and unique identifiers for each container. Data collected at different points in the distribution chain may be used by the container manufacturer as input to strengthen or lighten the containers or otherwise improve container manufacturing and/or design, or data may be provided (e.g., sold) to the customer (e.g., bottler) to evaluate overall cost of the container, number of times a container is refilled, the appearance and useful life of a container, or other useful metrics or qualitative information, or data may be provided to an interested party who may then use the data for a variety of purposes, for example, to evaluate how one or more containers are being used and/or how they perform in the field, how the manufacturer is compensated for the container, and the like.

The present disclosure embodies a number of aspects that can be implemented separately from, or in combination with, each other.

In accordance with one aspect of the disclosure, a method is provided that includes manufacturing containers, including forming the containers and serializing them with machine-readable codes integral to and irremovable from the containers. The method further comprises using the machine-readable codes to store data associated with the containers, including at least one of a date of container manufacture, a time of container manufacture, production facility data, or container quality data. The method still further comprises supplying the containers to a customer (e.g., bottler), and receiving, from the customer, data obtained from customer-readings of the machine-readable codes and including data relating to the filling of the containers. The method yet still further comprises receiving, from a seller of products including the containers, data obtained from seller-readings of the machine-readable codes and including at least one of a date of container sale, a time of container sale, or seller-specific data. The method further comprises analyzing the data from the customer-readings and seller-readings to determine certain information relating to the containers.

In accordance with another aspect of the disclosure, there is provided a method for container manufacturing and design. The method comprises designing and manufacturing containers including forming the containers and serializing each with a unique machine-readable code integral to and irremovable from the containers; and using the machine-readable codes to store data associated with the containers, including at least one of a date of container manufacture, a time of container manufacture, production facility data, or container quality data. The method further comprises supplying the containers to a customer; and receiving, from the customer, data obtained from readings of the machine-readable codes and including data relating to the filling of the containers. The method further includes using the data received from the customer as feedback for modifying a design of the containers to, for example, strengthen or lighten the containers, or for other purposes, for example, to increase speed and/or accuracy in filling, to track authentic products through their end use, and/or to detect counterfeit products that have entered the marketplace.

In accordance with yet another aspect of the disclosure, there is provided a system comprising: a central server; a database accessible by the server and providing storage for data relating to containers traveling within a distribution chain; and a plurality of electronic code readers located at different points throughout the distribution chain, the code readers being configured to read unique machine-readable codes carried by the containers and to electronically communicate data obtained as a result of the readings of the machine-readable codes to the central server, and wherein each machine-readable code is representative of data associated with the corresponding container. In an embodiment, the central server is configured to: receive from a customer to whom one or more containers were supplied, data obtained from customer-readings of the machine-readable codes of those containers by one or more of the plurality electronic code reader(s) located at the customer, wherein the data includes data relating to the filling of the containers; receive from a seller of products including the containers, data obtained from seller-readings of the machine-readable codes by another one or more of the electronic code reader(s) located at the seller, wherein the data includes at least one of a date of container sale, a time of container sale, or seller-specific data; and generate a report based on the data from the customer readings and seller readings.

In accordance with yet still another aspect of the disclosure, there is provided method comprising manufacturing containers, including forming the containers and serializing the containers with machine-readable codes integral to and irremovable from the containers, and using the machine-readable codes to store data associated with the containers, including at least one of a date of container manufacture, a time of container manufacture, production facility data, or container quality data. The method further comprises supplying the containers to a customer, and receiving from the customer, data obtained from customer-readings of the machine-readable codes and including data relating to the filling of the containers. The method still further comprises earning revenue from the customer in accordance with an established pricing model, which, in at least some embodiments wherein the containers are reusable containers, takes into account the quantity of refills of the reusable containers.

In accordance with a further aspect of the disclosure, there is provided a method comprising manufacturing containers, including forming the containers and serializing the containers with machine-readable codes integral to and irremovable from the containers, and using the machine-readable codes to store data associated with the containers, including, at least one of a date of container manufacture, a time of container manufacture, production facility data, or container quality data. The method further comprises supplying the containers to a customer, and receiving, from the customer, data obtained from customer-readings of the machine-readable codes and including data relating to the filling of the containers. The method still further comprises receiving, from one or more other locations in a distribution chain in which the containers travel, data obtained from readings of the machine-readable codes at those locations. The method yet still further comprises receiving compensation from the customer for the containers in accordance with an established pricing model, and providing the data to the customer in exchange for the compensation received from the customer.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

Figures 1, 2:
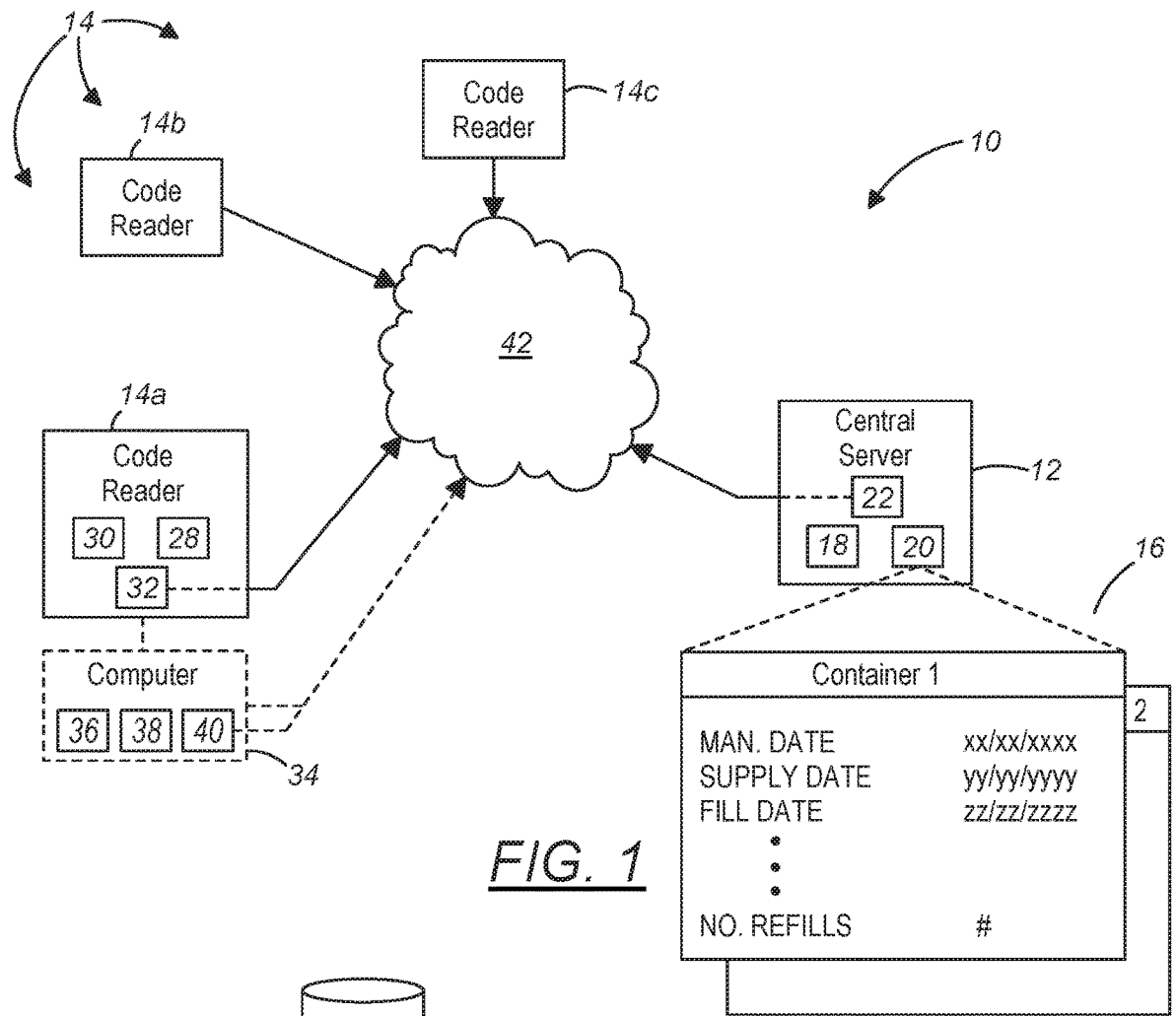
FIG. 1 is a perspective view of an illustrative embodiment of an operating environment comprising a system for tracking and collecting data about container(s) as the container(s) travel within or through a distribution chain.
FIG. 2 is an elevation view of a container having a machine-readable code applied thereto that may be tracked using the system illustrated in FIG. 1.

FIG. 1 depicts an operating environment that comprises a system 10 that may be used to implement the method disclosed herein. The system 10 generally includes a central server 12, a plurality of electronic code readers 14 (e.g., code readers 14a, 14b, 14c, etc.) configured to read machine-readable codes, and database or data repository 16 that is part of or accessible by the server 12. It should be understood that the disclosed method can be used with any number of different systems and is not specifically limited to the operating environment shown in FIG. 1. The following paragraphs provide a brief overview of one illustrative embodiment of the system 10; however, other systems not shown here could employ the disclosed method as well.

The central server 12 may be used to control, govern, or otherwise control and/or manage certain operations or functions of the system 10, including performing or facilitating some or all of the functionality of the method described below. The server 12 may be a standalone component or part of either another component or a larger system or network. Further, the central server 12 may comprise a single server element or a plurality of server elements. In the latter instance, the individual server elements may be electrically connected to each other to allow communication therebetween. The central server 12 may be implemented with a combination of hardware, software, firmware, and/or middleware, and, in an illustrated embodiment, may include one or more electronic processors or processing devices 18 and one or more electronic memory devices 20. In an embodiment, the memory device 20 may be a component of the processing device 18, while in another embodiment, it may be separate and distinct therefrom but accessible thereby.

The processing device 18 may comprise any type of suitable electronic processor or processing device (e.g., programmable microprocessor, microcontroller, center processing unit (CPU), application specific integrated circuit (ASIC), etc.) that is configured to receive and process data and/or execute appropriate programming instructions for software, firmware, programs, algorithms, scripts, etc., to perform various functions, for example and without limitation, those relating to the method described below. The processing device 18 may further include an input/output (I/O) or communication interface(s) 22 through which input and output signals may pass, for example, those communicated between the code readers 14 and the server 12 or between the server 12 and other components that may or may not be part of the system 10. The communication interface(s) 22 may include, or be electrically connected to and configured for communication with, certain communication-supporting infrastructure (e.g., one or more known components/devices, for example, routers, modems, antennas, electrical ports, transceivers, etc.), and is/are configured to communicate with various components of the system 10 via a public or private network or using other suitable communication techniques or protocols including, but not limited to, one or more of those described below.

The memory device 20 may include, for example, random access memory (RAM), read only memory (ROM), hard disk(s), universe serial bus (USB) drive(s), memory card(s), or any type of suitable electronic memory means and may store a variety of data. This includes, for example, software (e.g., code or logic), firmware, programs, algorithms, scripts, and other electronic instructions that, for example, are required to perform one or more of the functions described herein; and, in an embodiment, various data structures (e.g., databases, for example, database 16) for storing various information and data, including that required to perform some or all of the functions or method described herein.

As will be described in greater detail bellow, the server 12 may be configured and operable to receive data from one or more other components of the system 10 (e.g., code reader(s) 14), and to store the received data in one or more databases 16 stored in a suitable electronic memory device, for example and without limitation, the memory device 20 of the central server 12. Additionally, in at least certain embodiments, the central server 12 may also be configured to process and compile data that it receives and/or that is stored in the database 16, to generate reports relating to the received/stored data, to generate and/or interface with user interfaces displayed on a display device associated with the server 12 and/or the code readers 14 to provide data to and/or receive data from a user of the system 10.

The code readers 14 of the system 10 may be used to read machine-readable codes carried by containers, for example, the container 24 shown in FIG. 2 having one or more unique machine-readable code(s) 26 associated therewith, and, in at least some embodiments, to obtain the data contained within or represented by the machine-readable code(s) 26. The code readers 14 may comprise or include any number of devices known in the art, for example and without limitation, laser scanners, image scanners, charge coupled device (CCD) scanners, and camera-based readers, to cite just a few possibilities. And the code readers 14 may comprise handheld devices (e.g., handheld scanners, smart phones, tablets, or other personal digital electronic devices configured to capture an image or to scan or read a machine-readable code, etc.), non-handheld devices, or a combination of both handheld and non-handheld devices.

In any event, the code readers 14 may comprise any known machine-readable code readers known in the art, and may include a combination of hardware, software, and/or other components that enables the scanning or reading of machine-readable codes, among potentially other functionality.

For example, the code readers 14 may include means for acquiring an image of the code 26 and/or for detecting and decoding the code 26 being scanned. As shown in FIG. 1 with respect to code reader 14*a*, each of the code readers 14 may include an electronic processor or processing device 28 and an electronic memory device 30 that is part of or accessible by the processing device 28.

Similar to the processing device 18 of the central server 12, the processing device 28 of the code reader 14 may include any type of suitable electronic processing device (e.g., programmable microprocessor, microcontroller, central processing unit (CPU), application specific integrated circuit (ASIC), etc.) that is configured to process data and/or execute appropriate programming instructions for software, firmware, programs, applications, algorithms, scripts, etc., necessary to perform various functions of the code reader 14. The memory device 30 may include, for example, random access memory (RAM), read only memory (ROM), hard disk(s), universe serial bus (USB) drive(s), memory card(s), or any type of suitable electronic memory means and may store a variety of data. This includes, for example, software (e.g., code or logic), firmware, programs, applications, algorithms, scripts, etc., required to perform functions of the code reader 14.

In at least certain embodiments, the code readers 14 may also include one or more components to enable a user to manually provide or input certain data relating to the container(s) to which the machine-readable code(s) being scanned or read by the code reader 14 correspond. This data may include, for example, container location, container contents, container inspection data, date and/or time data, and other useful data. More particularly, the code reader 14 may include a user interface (not shown), for example and without limitation, a touch screen, keypad, keyboard, etc., that a user may utilize and/or manipulate to provide data relating to one or more containers. Each of the code readers 14 may further include one or more communication interfaces 32 that may include or be electrically connected to certain communication-supporting infrastructure (e.g., one or more known components/devices, such as, for example, routers, modems, antennas, electromechanical ports, transceivers, etc.) to allow for the communication and exchange of data between the code reader 14 and one or more other components of the system 10, for example, the central server 12.

In some embodiments, rather than the code reader 14 being configured to enable or allow a user to provide data relating to container(s) being scanned or read (e.g., via a user interface thereof), another component of the system 10 may provide this functionality. For example, in an illustrative embodiment, one or more of the code readers 14 may be electrically connected to, for example, a computer 34 or other like device having one or more user interfaces (e.g., touch screen, keypad, keyboard, mouse, etc.) that a user may utilize to provide data to the central server 12. In addition to the user interface(s), the computer 34 or other like device may further include an electronic processor or processing device 36 and an electronic memory device 38 that is accessible by the processing device 36. The processing device 36 is similar to those described above in that it may include any type of suitable electronic processing device (e.g., programmable microprocessor, microcontroller, central processing unit (CPU), application specific integrated circuit (ASIC), etc.) that is configured to process data and/or execute appropriate programming instructions for software, firmware, programs, applications, algorithms, scripts, etc. necessary to perform various functions. Likewise, the memory device 38 is similar to those described above in that it may include any type of suitable electronic memory means and may store a variety of data. This includes, for example, software (e.g., code or logic), firmware, programs, applications, algorithms, scripts, etc., required to perform various functions. The computer 34 may further include one or more communication interfaces 40 that may include or be electrically connected to certain communication-supporting infrastructure (e.g., one or more known components/devices, such as, for example, routers, modems, antennas, electromechanical ports, transceivers, etc.) to allow for the communication and exchange of data between the computer 34 and a code reader 14, as well as between the computer 34 and the central server 12. Accordingly, in an embodiment wherein one or more of the code readers 14 is connected to a computer 34, the communication interface 32 of the code reader 14 may be electrically connected to a communication interface 40 of the computer 34, and another communication interface 40 of the computer 34 may be electrically connected to the central server 12 via a suitable communication network, for example, a private or public network (e.g., the internet) or using other suitable communication techniques or protocols including, but not limited to, one or more of those described elsewhere herein. The computer 34 may receive data from the code reader 14 following the scanning or reading of a code carried by a container, package the scanned data with the user-provided data via the computer 34, if applicable, and then communicate all of the data to the central server 12.

While certain code readers and arrangements relating thereto have been described above, it will be appreciated that the present disclosure is not limited to the use of any particular type of code reader(s) or corresponding arrangement(s). Additionally, the system 10 may include and/or be configured to support any number of code readers 14. As will be appreciated in view of the description of the method set forth below, code readers 14 may be distributed at different points or locations throughout a distribution chain in which containers travel (e.g., container manufacturer, customer, point of sale, consumer/end user, return/collection center, etc.). Accordingly, the system 10 may include one or a plurality of code readers, and thus, is not limited to any particular number of code readers 14.

As briefly described above, various components of the system 10 may be configured to communicate with each other to exchange data therebetween. This communication may be facilitated across a suitable communications network through communication interfaces of the individual components. The communications network, identified as reference numeral 42 in FIG. 1, may comprise a wired or wireless network, for example, one or a combination of: a suitable Ethernet network; radio and telecommunications/telephone networks (e.g., cellular networks, analog voice networks, or digital fiber communications networks); or any other suitable type of network and/or protocol (e.g., local area networks (LANs), wireless LANs (WLANs), broadband wireless access (BWA) networks, personal area networks (PANs), publicly switched telephone networks (PSTNs), etc.). The communications network 42 may be configured for use with one or more standard communications technologies and protocols, and may utilize links using known technologies, for example, Ethernet, IEEE 802.11, integrated services digital network (ISDN), digital subscriber line (DSL), as well as other known communications technologies. Similarly, the networking protocols used on a network to which some or all of the components of the system 10 are interconnected may include multi-protocol label switching (MPL), the user datagram protocol (UDP), the hypertext transport protocol (HTTP), the simple mail transfer protocol (SMTP), and the file transfer protocol (FTP), among other suitable network protocols. In an embodiment, the transmission control protocol/Internet protocol (TCP/IP) may be used, in which case it will be appreciated that each component configured for communication using such a protocol can be configured with a static IP address or can be set up to automatically receive an assigned IP address from another device on the network. Further the data exchanged over such the network 42 may be represented using technologies, languages, and/or formats, such as the hypertext markup language HTML), the extensile markup language (XML), and the simple object access protocol (SOAP) among other suitable data representation technologies. Accordingly, it will be appreciated in view of the foregoing that the communication between various components of the system 10 may be facilitated in any number of ways using any number of techniques, and therefore, the present disclosure is not limited to any particular way or technique(s); rather any suitable way or technique may be utilized.

The database 16 is configured to store data relating to containers manufactured by a particular manufacturer. The data stored in the database 16 may comprise, for example, data manually entered or input by the manufacturer or by a user acting on the behalf of the manufacturer, including, for example, unique identifiers (e.g., serial numbers or code) corresponding to each container manufactured by the manufacturer, data relating to where and when the containers were manufactured, container quality (i.e., inspection) data, etc., as well as data received at the central server 12 as a result of the scanning or reading of the machine-readable code(s) of one or more containers by one or more code readers 14. Accordingly, and as shown in FIG. 1, the database 16 may be arranged or organized such that it contains a record for each container manufactured by the manufacturer, wherein the record contains data relating to that particular container. Each record may, in turn, be tied or associated to a particular customer to whom the corresponding container was supplied to allow all of the data relating to a particular customer to be easily located and compiled. As data is received by the central server 12 from, for example, a code reader 14 or as result of a scan/read by a code reader 14, the processing device 18 of the server 12 is configured to process the data to determine which container the received data corresponds to, and to then store the data in the record in the database that is associated with that particular container. The type of data that may be stored in the database is essentially unlimited and may include, for example and without limitation: manufacturer-related data (e.g., the date/time the container was manufactured, the production line used to manufacture the container, the date/time the container was supplied to a customer, etc.); customer-related data (e.g., one or more of a date/time the container was filled by the customer, the contents of the container, a number of times the customer has filled/refilled the container, inspection data relating to the container, a date(s) the container was supplied to a distributor or seller of products (or point of sale), the type of packing used to ship the containers (e.g., box packs), etc.); distributor-related data (e.g., one or more of a date/time the container was received by the distributor, a date/time the container was supplied to a seller of products, the type of packing used to ship the containers (e.g., box packs), the name of the distribution center or channel shipped to, etc.); seller-related data (e.g., one or more of a date/time the container was received by the seller of products, a date/time the goods/container was sold to an end user, etc.); and end user-related data (e.g., one or more of a date/time a consumer/end user purchased the goods/container, a date/time the end user consumed or used the contents of the container, etc.), to cite only a few possibilities. The database 16 may be stored in or on a suitable electronic memory device, for example, the memory device 20 of the central server 12 or another suitable memory device of or accessible by the central server 12. Accordingly, the present disclosure is not intended to be limited to the database 16 being stored in or on any particular memory device.

In any event, and as will be described in greater detail below, the data stored in the database 16 may be used for a variety of purposes. For example, it may be used to evaluate how a particular container is used by a customer, how it moves through the distribution chain, how it performs as it repeatedly travels through the distribution chain, etc. The stored data may be compiled or agglomerated in a number of ways to suit the purpose of its use, and in it at least some instances, may be sold to customers and/or other interested parties. For example, the data may be compiled or agglomerated on a customer-by-customer basis such that a particular customer can see how it is using the containers it is supplied with and/or how the containers it is supplied with are performing as they travel through the distribution chain (e.g., is the quality holding up). Using the agglomerated data, the customer may also be able to learn how different types of containers are used and/or perform, how the use and/or performance of the containers supplied to it by the manufacturer compare to the use and performance of containers supplied to other customers, how the use and/or performance of containers in different distribution chains compare to each other, etc. The data may also be used to determine compensation owed to (earned by) the manufacturer in an instance wherein a customer owes the manufacturer a fee each time a container (e.g., reusable container) is filled/refilled. Data may additionally or alternatively be used to track authentic products/containers through the distribution chain and end use, or to identify counterfeit products/containers that have entered the distribution chain. Accordingly, it will be appreciated that the data stored in the database 16 may be used for any number of purposes, including purposes not expressly described herein.

Figure 3:
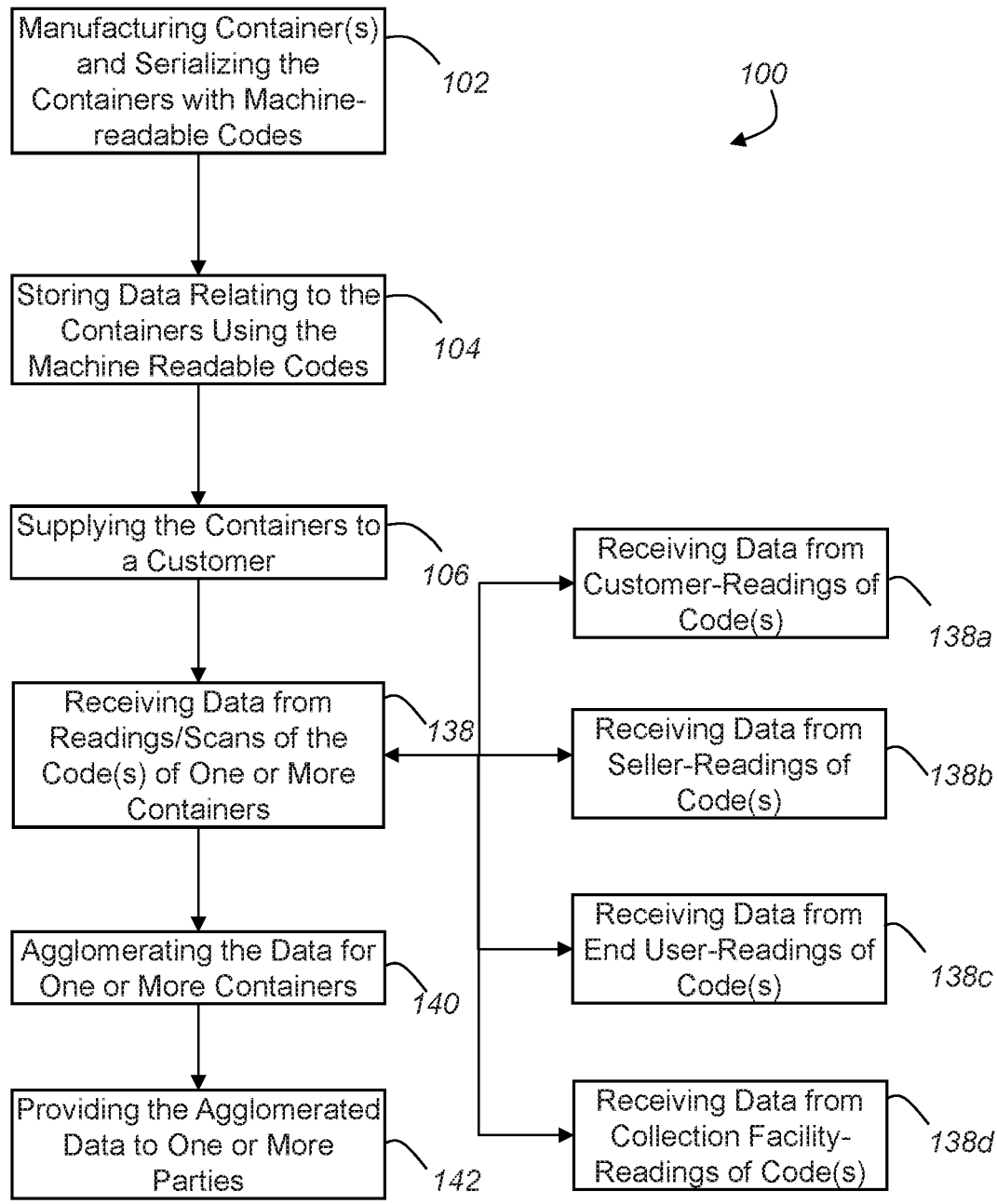
FIGS. 3-5 are flowcharts showing various steps of illustrative embodiments of a method for tracking and collecting data about container(s) as the container(s) travel within or through a distribution chain.

Turning now to FIG. 3, an illustrative embodiment of a methodology that may be implemented or performed in part using, for example, the above-described system 10 will be described. More particularly, FIG. 3 illustrates a method of tracking and collecting data about containers as the containers travel through a distribution or supply chain. It should be noted that while certain steps of the methodology will be described as being performed or carried out by one or more particular components of the system 10, in other embodiments, the steps may be performed by components of the system 10 other than that or those described, or components not part of the system 10 but configured for use therewith. Additionally, while the description of method 100 is with respect to the system 10, it will be appreciated that the implementation or application of method 100 is not limited to the particular composition or arrangement of the system 10 described above, but rather may be implemented with or by any number of suitably configured or arranged systems.

In an illustrative embodiment, the method 100 includes a step 102 of manufacturing one or more, and in an embodiment, a plurality, of containers. In at least some embodiments, some or all of the containers manufactured in step 102 comprise reusable containers. In other embodiments, however, some or all of the containers may comprise single-use or one-trip containers. Accordingly, the present disclosure is not intended to be limited to any particular type (e.g., reusable or non-reusable) type(s) of containers. While the particular manner which the containers are manufactured is dependent on the type of container (e.g., glass, plastic, metal, etc.), any number of known manufacturing processes may be utilized. For example, a plastic container may be manufactured using any number of plastic injection and/or blow molding techniques. Metal containers may be manufactured using, for example, metal stamping and drawing processes. Glass containers may be manufactured using any number of glass manufacturing techniques, for example and without limitation, those that include a "hot end" and a "cold end." As is known in the art, the hot end may include one or more glass melting furnaces to produce a glass melt, one or more forming machines to form the glass melt into glass containers, and one or more applicators to apply a hot-end coating to the glass containers. The "hot end" also may include an annealing lehr, or at least a beginning portion of the annealing lehr, for annealing the glass containers therein. Through the lehr, the temperature may be brought down gradually to a downstream portion, cool end, or exit of the lehr. The "cold end" may include an end portion of the annealing lehr, applicators to apply one or more cold-end coatings to the glass containers downstream of the annealing lehr, inspection equipment to inspect the containers, and packaging machines to package the containers.

In any event, in addition to forming of the containers, step 102 further includes serializing the containers with machine-readable codes, including applying the codes to the appropriate containers. For purposes of this disclosure, the term "serializing" is intended to mean providing each container with a unique identifier code. The machine-readable codes may take any number of forms, including, but certainly not limited to, multi-dimensional data matrices, dot matrices, barcodes, and other suitable machine-readable codes. Illustrative examples of machine-readable codes that may be suitable for the purposes described herein are those described in U.S. Patent Publication Nos. 2013/0341228, 2014/0116911, and 2015/0028110, the entire contents of which are incorporated herein by reference; though other codes may certainly be used. More particularly, the machine-readable codes may comprise an identifying marker that includes or one more optically-readable elements or combination of elements (e.g., dots, numbers, symbols, graphics, or other indicia) arranged in a particular manner. In an embodiment, the machine-readable codes applied to the containers may be integral to and irremovable form the containers. Integral and irremovable codes make it both more difficult to produce and easier to identify counterfeit containers. The codes may be applied to the containers as part of the container manufacturing process using any number of known techniques, for example and without limitation: laser etching the codes onto/into the outer surface of the containers; stamping the codes onto/into the outer surface; utilizing embossing/debossing techniques; and/or via a combination of selective application of electromagnetic radiation followed by application of focused beam radiation or energy in a pattern corresponding to a desired code, to cite only a few possibilities.

Method 100 may further include a step 104 of using the machine-readable codes to store data associated with the respective containers to which the codes correspond. As will be appreciated in view of the description below, step 104 may comprise a substep of step 102, may be a separate step performed after step 102, or may comprise a combination of both.

In some embodiments, step 104 comprises generating or defining the machine-readable codes to represent or identify certain data associated with the containers to which the codes correspond. For instance, the machine-readable codes themselves may identify manufacturing data relating to the containers. For example, for a given container, the code applied thereto may identify at least one of the manufacturing plant used to produce the container, the production line used in the manufacture of the container, the date and/or time the container was produced, data relating to the quality of the container (i.e., inspection data), and the like. To better illustrate, in one illustrative example a machine-readable code may comprise or be representative of a six (6) digit number "######" wherein the first digit represents the manufacturing plant (e.g., "1 #####" for a first plant, "2 #####" for a second plant, etc.), the second digit represents the line at the plant that was used (e.g., "#1 ####" for a first line, "#2 ####" for a second line, etc.), the third and fourth digits represent the month in which the container was manufactured (e.g., "##01 ##" for January, "##02 ##" for February, etc.), and the last two digits represent the year in which the container was manufactured (e.g., "####14" for 2014, "####15" for 2015, etc.). In certain instances, an additional sequential or random character could be added to the code to create an identifier that is unique to the container to which it corresponds. Accordingly, a code that comprises or represents the number "210614-ABCXYZ" identifies that the corresponding container was manufactured at "plant 2" using "line 1" in "June 2014," and an identifier of ABCXYZ that is unique to that container. It will be appreciated that the aforedescribed code was provided for illustrative purposes only and that codes having more or less digits or taking other forms (e.g., codes that alphabetic, alphanumeric, or containing other characters or indicia) may certainly be used instead. In any event, in an instance wherein the code comprises or represents such a character string, the code may comprise the string itself or a code that can be decoded to obtain the string.

In another embodiment, rather than the machine-readable code itself representing certain data, step 104 may comprise generating or defining the machine-readable codes so that they simply represent, for example, an identifier (e.g., an alphabetic, numeric, alphanumeric, etc. identification code) that is unique to the container to which it is applied and that may be used to look-up data associated with that identifier that is stored, for example, in the database 16. In such an embodiment, data associated with the unique identifier, and therefore the corresponding container (e.g., that data described above), may be manually or automatically entered or loaded into the database 16.

In any event, each machine-readable code that is applied or carried by a container may be associated with a respective record stored in the database 16. All data that is obtained by the central server 12 upon the scanning or reading of that code or otherwise (e.g., manually entered data) may be associated with the appropriate container and then stored in the record within the database 16 that corresponds to that container.

In an embodiment, method 100 further includes a step 106 of supplying the containers to a customer, who, in an illustrative embodiment, comprises a bottler of food and/or beverage products. This may comprise, for example, loading a certain number of containers onto a truck, train, boat, airplane, or a combination thereof, and delivering them to the customer. Alternatively, the customer may pick up the containers at the manufacturer's facility. Regardless of how the containers are supplied, in an embodiment, the manufacturer may either manually enter certain data into the records in the database 16 that correspond to the container(s) being supplied, or may scan/read the machine-readable codes on the container(s) using a code reader 14 at the manufacturer's facility, which may then automatically add the data to the record with or without additional interaction on the part of the manufacturer (e.g., the manufacturer may be prompted to identify/confirm that the data received from the code reader 14 is accurate). In either instance, the data added to the record for a given container may comprise at least one of a date and/or time the container was supplied to a customer, the name of the customer, the geographic location of the customer and/or manufacturer, and/or other useful data.

In an embodiment, step 106 may comprise supplying the containers to the customer at a market sale price (i.e., a price at which the containers are typically sold), while in another embodiment, and as will be described below, the containers may be supplied at a price other than a market sale price, for example, a reduced price that is below the market sale price. Additionally, in at least certain embodiments, the containers being supplied may be contained within a pallet, and the codes of the containers may be associated or correlated with an identifier (e.g., code) corresponding to the pallet, and that association or correlation may be stored, for example, in the database 16.

Figure 4:
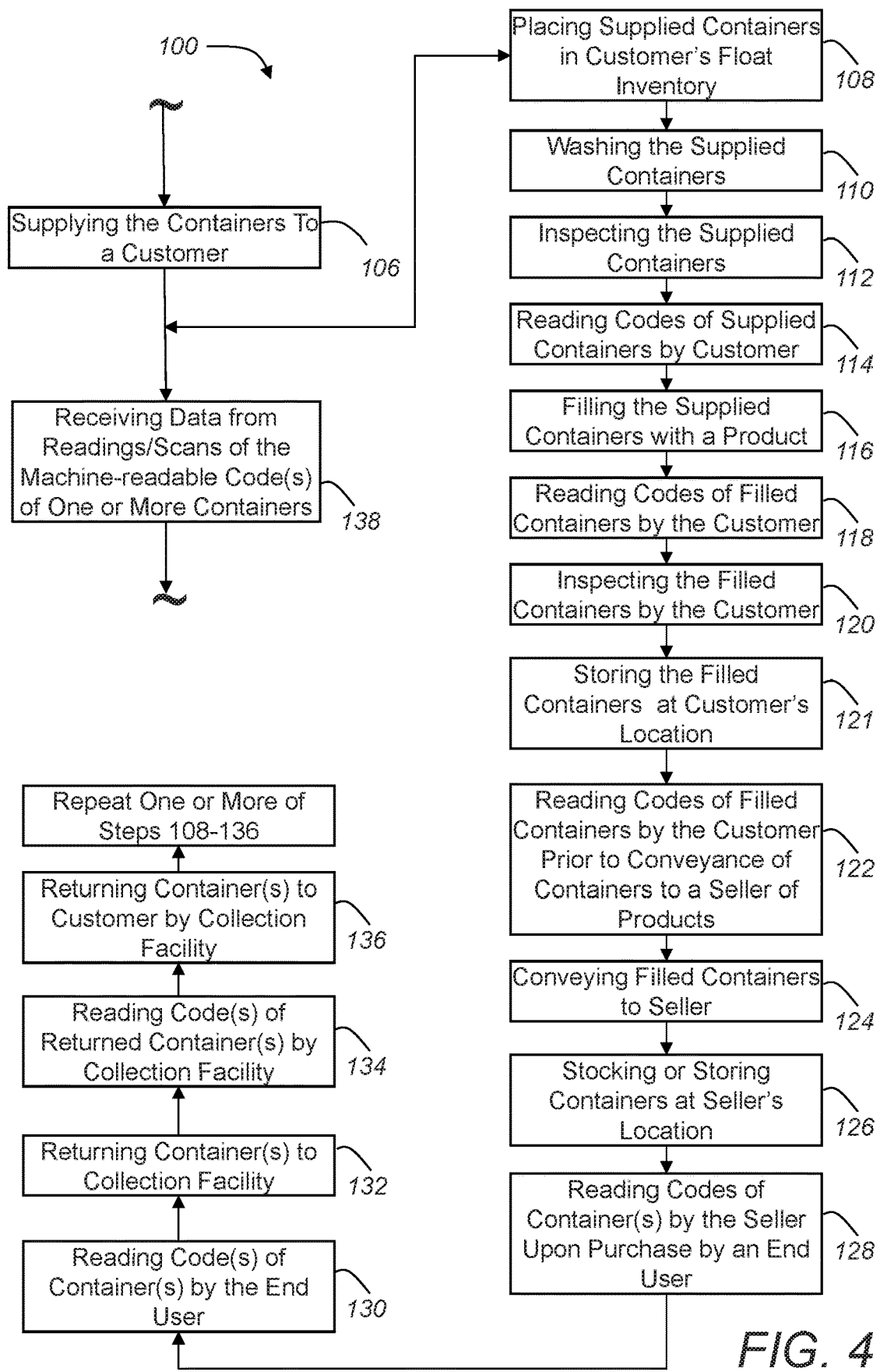

Once the containers are received by the customer in step 106, method 100 may include a number of steps that may be performed by the customer, one or more of which may be optional. For example, and as illustrated in FIG. 4, method 100 may include a step 108 of placing the supplied containers into the customer's float inventory for later use, a step 110 of washing the supplied containers using known washing techniques, and/or a step 112 of inspecting the supplied containers using known inspection techniques. The inspection may be completed optically using a comparometer or a camera. The container may be inspected for the presence of, for example, cracks, broken finishes, chips, bottle design, debris inside the container, and bottle integrity, to cite a few possibilities. Inspection may also be used to detect aesthetic issues, for example, external scuffing, scratches, and chips, to cite a few possibilities. The machine-readable codes on the containers may also be scanned or read in a step 114 using a machine-readable code reader 14 at the customer's location, and information or data resulting from that/those scan(s)/reading(s) may be, for example and as will be described in greater detail below, sent to the central server 12 and logged in the database 16.

With continued reference to FIG. 4, following step 106 and, if applicable, following one or more of steps 108-114 described above, the method 100 may comprise a step 116 of filling the supplied containers with a product. This may comprise manually filling the containers or automatically filling the containers using an automated fill line at the customer's facility. Once the containers are filled in step 116, the machine-readable codes applied thereto may be scanned or read in a step 118 using the machine-readable code reader 14 at the customer's location and, as with step 114 described above, information or data resulting from that/those scan(s)/reading(s) may be, for example and as will be described in greater detail below, sent to the central server 12 and logged in the database 16. Whether or not the filled containers are scanned in step 118, method 100 may further include a step 120 of inspecting the filled containers for, for example, fill height, proper labeling, and/or the presence of a cap, to cite a few possibilities. This inspection may be performed optically with a camera or may be completed using one or more lasers or other type(s) of sensor(s). Method 100 additionally or alternatively comprise a step 121 of storing the filled containers in a suitable location until it is time to supply (e.g., ship) the containers to a distributor, a seller of products, or some other recipient.

When it is time to supply the containers to, for example, a distributor or a seller of products, method 100 may include a step 122 of scanning/reading the machine-readable code(s) of the containers, and/or a step 124 of shipping or otherwise conveying the containers to the intended recipient. In an instance wherein method 100 includes step 122, the codes of the containers may be scanned or read using the machine-readable code reader 14 at the customer's location and information or data resulting from that/those scan(s)/reading(s) may be, for example and as will be described in greater detail below, sent to the central server 12 and logged in the database 16.

Upon receipt of the filled containers conveyed to the seller in step 124, method 100 may include a step 126 of stocking or storing the containers at a sales location, which in an embodiment may comprise a retail store, a restaurant, a bar, or some other like establishment or sales location (e.g., vending machine, kiosk, etc.), from which the containers and product contained therein may be purchased by a consumer or end user. Each time a container/product is purchased by an end user, the seller of products may scan or read the machine-readable code of the container in a step 128 using a machine-readable code reader 14 at the seller's location, and information or data resulting from that/those scan(s)/reading(s) may be, for example and as will be described in greater detail below, sent to the central server 12 and logged in the database 16.

Following the sale of a container/product, the machine-readable code on the container may be scanned/read by the end user one or more times in a step 130 using a machine-readable code reader 14 at the end user's location or accessible by the end user (e.g., a code reader in the form of, for example, a smart phone, tablet, PDA, handheld scanner, etc.). More particularly, the end user may scan the code when the container is opened, when the product is being consumed or used, and/or following the consumption or use of the product. As with the readings or scans described above, information or data resulting from the scan/reading in step 130 may be sent to the central server 12 and logged in the database 16.

When the container is no longer needed by the end user, the end user may return the (empty) container to a collection facility in a step 132. At the collection facility, the machine-readable code of the container may be scanned or read in a step 134 using a code reader 14, and information or data resulting from that/those scans may be sent to the central server 12 and logged in the database 16 in a step 134. The container may then, in a step 136, be returned (e.g., picked up, shipped, or otherwise conveyed or transferred) to, for example, the customer who originally filled the container, and in an instance wherein the container is a reusable container, some or all of steps 108-136 may then be repeated one or more times over the life of the container. It will be appreciated in view of the foregoing that the method 100 provides a way in which a container may be tracked over its entire lifecycle from manufacture to when the container is no longer used and is disposed of In other words, method 100 provides a way to track a container essentially from cradle to grave.

In addition to the steps described above, and as illustrated in, FIG. 3, method 100 may further include a step 138 of receiving the data obtained or resulting from the reading(s) or scan(s) of the machine-readable codes of the containers in steps 114, 118, 122, 128, 130, and/or 134. More particularly, and as described above, as the containers travel within a given supply or distribution chain, the codes of the supplied containers may be read or scanned by code readers 14 located at one or more points in the distribution chain, including, but not limited to, one or more of those distribution chain points identified and described elsewhere herein. Data resulting from those readings or scans may then be packaged and communicated over a suitable communications network, such as network 42, to, for example, the central server 12 or another suitable component of the system 10 connected to network 42, which then stores the data in the database 16.

By way of illustration, in at least some embodiments, step 138 (step 138a in FIG. 3) comprises receiving data obtained from the customer-readings of the machine-readable codes of one or more containers taken in one or more of steps 114, 118, and 122. For a given container, this data may include, for example and without limitation, data relating to the customer, the filling of the container, and/or the supplying of the container to another party. More particularly, in an illustrative embodiment, this data may include at least one of a date on which the container was filled, a time at which the container was filled, the contents of the container, a number of times the container has been used/filled (or reused/refilled) by the customer, an amount of time that has elapsed since the container was last filled, a date and/or time that the filled container was supplied to a distributor or seller of products, the name and/or location of the recipient of the filled container (e.g., distributor and/or seller of products), the name of the customer, the geographic location of the customer, the fill line that the customer used to fill the container, the batch number of the product the container was filled with, data relating to the packing of the container (e.g., type of packing used to ship the container (e.g., box packs)), or data relating to an inspection of the container performed by the customer, to cite just a few possibilities.

In any event, the data received from the customer may comprise data obtained as a result of the scanning or reading of the machine-readable code on the container. For example, the code reader 14 at the customer's location may be programmed with or able to ascertain certain data (e.g., some or all of that described above) that comprises or is automatically included as part of the data that is communicated to the central server 12 when the code is scanned or read. Alternatively, the data communicated to the central server 12 in step 138a may comprise data obtained by a combination of the scanning or reading of the code and user inputs. Regardless of the type of data that is received, the received data may be associated with the container to which it corresponds and stored in the database 16 of the system 10 along with other information relating to that container, if applicable. More particularly, in an embodiment, upon receiving data corresponding to a particular container, the processing device 18 of the server 12 may process the data to identify the container to which the received data corresponds, access a record stored in the database 16 that is associated with that container and that may contain data relating to that container, and then store the received data in that record. For example, in an embodiment, the processing device 18 may process the received data to identify a unique identifier assigned to the container to which the received data corresponds, access the record stored in the database that is associated with that unique identifier, and then store the received data in that record. While an illustrative way of associating the data received in step 138 with the container to which it corresponds has been described above, it will be appreciated that the present disclosure is not limited to any particular way(s) of doing so; rather, any number of ways of arranging or organizing data may used in addition to or instead of the particular way described above.

In addition to receiving data obtained from customer-readings of the machine-readable codes, step 138 (step 138b in FIG. 3) may also include receiving data obtained from the seller-readings taken in step 128 of machine-readable codes of one or more containers supplied to the seller by the customer. As described above, once the customer fills one or more of the containers it was supplied with in step 106, the customer may supply that or those filled containers to a seller of products (e.g., a retail store, a restaurant, a bar, or other like establishment). As described above with respect to step 128, the seller of products may scan or read the machine-readable codes of those container(s) one or more times (e.g., upon receipt of the containers from the customer, upon the stocking of the containers, upon sale to an end user, etc.). In response to that or those scan(s) or reading(s), data may be communicated to, for example, the server 12 of the system 10. For a given container, this data may include, for example and without limitation, at least one of data relating to the seller (e.g., geographic location, name, etc.), a date and/or time of receipt of the container from the customer, a date and/or time of the sale of the container/product to an end user, data relating to an inspection of the container performed by the seller, or other useful information.

In any event, and as with the data received from the customer, the data received from the seller may comprise data obtained as a result of the scanning or reading of the machine-readable code on the container. For example, the code reader 14 at the seller's location may be programmed with or able to ascertain certain data (e.g., some or all of that described above) that comprises or is automatically included as part of the data that is communicated to the central server 12 when the code is scanned or read. Alternatively, the data received in step 138b may comprise data obtained by a combination of the scanning or reading of the code and user inputs. Regardless of the type of data that is received from the seller readings, the received data may be associated with the container to which it corresponds and stored in the database 16 of the system 10 along with other data relating to that container, if applicable. This may be done in a number of ways including, for example and without limitation, the way(s) described above with respect to data received as a result of customer readings of the codes, which description will not be repeated but rather applies here with equal weight.

In at least some embodiments, step 138 (step 138c in FIG. 3) may additionally or alternatively include receiving data obtained from the end user-readings of machine-readable codes of one or more containers supplied to the end user by the seller of products taken in step 130. As described above, the seller may sell/distribute the product and container received from the customer to an end user. The end user who receives the product may scan or read the machine-readable codes of the purchased container one or more times using, for example, a code reader 14 in the form of a smart phone, tablet, PDA, etc. (e.g., upon the purchase of the container/product, the consumption or use of the product, etc.). In response to that or those scan(s) or reading(s), data may be communicated to, for example, the server 12 of the system 10. For a given container, this data may include, for example and without limitation, at least one of data relating to the date and/or time of the scanning or reading of the code, a date and/or time of the purchase and/or receipt of the product/container, the geographic location of the purchase, the end user's geographic location, the end user's contact information (e.g., email address, telephone number, mailing address, etc.), a date and/or time of the consumption or use of the product contained with the container, or other useful information.

In any event, and as with the data received from the customer and seller of products, the data received from the end user may comprise data obtained as a result of the scanning or reading of the machine-readable code on the container. For example, the code reader 14 used by the end user may be programmed with or able to ascertain certain data (e.g., some or all of that described above) that comprises or is automatically included as part of the data that is communicated to the central server 12 when the code is scanned or read. Alternatively, the data received in step 138c may comprise data obtained by a combination of the scanning or reading of the code and user inputs. Regardless of the type of data that is received from the end user readings, the received data may be associated with the container to which it corresponds and stored in the database 16 of the system 10 along with other data relating to that container, if applicable. This may be done in a number of ways including, for example and without limitation, the way(s) described above with respect to data received as a result of customer readings of the codes, which description will not be repeated but rather applies here with equal weight.

In addition to the above, step 138 (step 138d in FIG. 3) may further include receiving data obtained from the collection facility readings of machine-readable codes taken in step 134 of one or more containers returned by or collected from end users. As described above with respect to steps 132 and 134, when a container purchased by an end user is no longer needed, the end user returns the empty container to a collection facility. The collection facility may scan or read the machine-readable codes of that container taken in step 134, and may then in step 136 return the container to the customer to whom it was originally supplied in step 106. In response to that scan or reading, data may be communicated to, for example, the server 12 of the system 10. For a given container, this data may include, for example and without limitation, at least one of data relating to the collection facility (e.g., geographic location, name, etc.), a date and/or time of receipt of the container from the end user, a date and/or time of the return of the container to the customer, or other useful information.

In any event, the data received from the collection facility may comprise data obtained as a result of the scanning or reading of the machine-readable code on the container. For example, the code reader 14 at the collection facility may be programmed with or able to ascertain certain data (e.g., some or all of that described above) that comprises or is automatically included as part of the data that is communicated to the central server 12 when the code is scanned or read. Alternatively, the data received in step 138d may comprise data obtained by a combination of the scanning or reading of the code and user inputs. Regardless of the type of data that is received from the collection facility readings, the received data may be associated with the container to which it corresponds and stored in the database 16 of the system 10 along with other data relating to that container, if applicable. This may be done in a number of ways including, for example and without limitation, the way(s) described above with respect to data received as a result of customer readings of the codes, which description will not be repeated but rather applies here with equal weight.

It will be appreciated that while several examples have been provided of possible points or locations within a container supply or distribution chain at which a machine-readable code of a container may be read or scanned, and therefore, data relating to the corresponding container obtained, the machine-readable codes of containers may certainly be scanned or read at points or locations in a distribution chain other than those described above, for example, at one or more intermediate or intervening locations or points to one or more of those described above (e.g., at a distributor or wholesaler that is between the customer and the seller of products, among potentially others). Thus, it will be appreciated that the present disclosure is not intended to be limited to any particular locations or points within a supply chain at which a machine-readable code may be scanned or read and data obtained.

The data obtained in step 138 may be used in any number of ways. For example, in at least some embodiments, the method 100 may include a step 140 of agglomerating or compiling the received data (as well as, in at least certain embodiments, other stored data) in a particular way so that it may be evaluated by, for example, the manufacturer, the customer to whom the containers were supplied in step 106, and/or other interested parties. Accordingly, in at least some embodiments, the method 100 may comprise further a step 142 of providing, and in certain instances, selling, the data to the customer and/or other interested parties (e.g., other customers of the manufacturer in a particular industry). In an embodiment, either step 140 or step 142 may include generating a report (e.g., electronic, hardcopy, or both) representative of the agglomerated data that may then be provided to the customer in step 142.

The data may be compiled, agglomerated, and/or organized in step 140 in any number of ways including, but not limited to, one or more of the ways described below. In an illustrative embodiment, step 140 comprises performing statistical or other analysis on the data, for example, comparing information relating to one container supplied to a customer with information relating to another container supplied to the same customer to show how the different containers have travelled through the supply chain. In another embodiment, step 140 may comprise comparing data relating to one type of container with data relating to another type of container to show how the respective container types are used and perform relative to each other. Step 140 may also or alternatively comprise comparing data relating to containers of one product brand with data relating to containers of one or more other product brands (e.g., product brands of the same customer or product brands of different customers) to show how containers used in different brands perform and/or are used. Step 140 may also or alternatively include comparing data for containers traveling in one distribution channel with data for containers traveling in a different distribution channel to show how containers are used or perform in different distribution channels. Step 140 may additionally or alternatively comprise using the data to provide a more complete snap-shot of a given industry or segment of an industry (e.g., beer, wine, spirits, etc.) from filling through actual consumption, as opposed to through a point of sale (e.g., from check out scan at a retail establishment). Step 140 may additionally or alternatively comprise analyzing the received data (e.g., data received from customer-readings and seller-readings of the machine-readable code(s) of one or more containers) to determine certain information relating to one or more of the supplied containers (e.g., one or more of length of time a container was in the seller's inventory prior to sale, seller demographics, type of seller, etc.).

Accordingly, it will be appreciated in view of the foregoing that data corresponding to containers supplied by the manufacturer to one or more customers may be agglomerated and used in any number of ways, including, but certainly not limited to, those described above. In any event, in an embodiment, the central server 12, and the processing device 18 thereof, in particular, is configured to perform step 140. It will be appreciated, however, that in other embodiments, step 140 may be performed by a different component of the system 10, and thus, the present disclosure is not intended to be limited to step 140 being performed by any particular component of the system 10.

A party to whom the agglomerated data is provided in step 142 may use the information or data in any number of ways and for any number of purposes. For example, in an instance wherein the data is provided to the customer to whom the containers were initially supplied in step 106, the customer may be able to evaluate how it is using the containers it is supplied with. More particularly, the customer may be able to determine how long a container remains in its float inventory, how much time elapses between refills or reuses of the containers, how long it takes for a container supplied to a seller of products to ultimately be returned to the customer, and how the quality of the containers is affected as the containers travel (repeatedly) through at least certain points in the distribution chain based on inspection information that is received, to cite a few possibilities. The customer may also be able to learn how other types of containers are used or perform, as well as how containers supplied by the manufacturer to other customers are used and/or perform.

The knowledge gleaned from the data may then be used by the customer to determine, for example, whether or not to alter the way it does business. More specifically, the data may allow the customer to better understand its float inventory and may lead to more efficient use of the containers it is supplied with. The data may provide the customer a view of the total float inventory, e.g., whether it is growing or shrinking, and to determine whether the containers in the float inventory are moving quickly or slowly in one or more areas of the market. In response to the data, the customer may, for example, decide to order more or fewer containers from the manufacturer; change the type of container(s) it uses; manage its float inventory and use the containers in its inventory in a more efficient manner; incentivize the prompt return of containers after an end user has used or consumed the contents of the containers using targeted advertising (e.g., television advertisements encouraging the return of containers) and incentives (e.g., monetary or financial incentives payable upon the return of containers), especially in areas of the market where the float is particularly slow moving, and the like. Additionally or alternatively, the customer may be able to evaluate how the product packaged in the containers is being consumed. For example, the customer may be able to determine whether the product remains on the shelf at a point of sale (e.g., seller of products) for an extended period of time, or is being sold quickly. The customer may be able to determine who is consuming its product, and to then direct marketing or advertising to that specific end user. In such an instance, the method may include identifying an advertisement, offer, or other marketing message to send to a given end user, and then communicating—electronically or otherwise—that advertisement or offer to the end user. Similarly, the customer may be able to determine the actual moment of consumption on an individualized basis, and to then direct a marketing message to that specific end user at, or shortly after, the moment of consumption. In an embodiment, a label on the container may direct the end user to scan or "check-in" using the container. Once scanned, the end user may be prompted to login or other identifying methods may be used to determine the demographics or identity of the end user. In an embodiment, this data traffic may be initially handled by the manufacturer, but could easily be transferred to the customer for handling. Otherwise, the manufacturer (e.g., a data center) could send marketing interactions to the end user's device. The customer can then be charged for the interaction or for handling the marketing message and getting the consumption information.

Accordingly, it will be appreciated in view of the foregoing that the customer may use information it is provided within step 142 in any number of ways, including ways not expressly described herein. It will therefore be further appreciated that the present disclosure is not intended to be limited to any particular use(s) of the provided information.

In addition to the customer using the data provided in step 142, in at least certain instances, the data may also be useful to the container manufacturer. For example, the manufacturer may use the information or data received from different points in the distribution chain to learn how a particular container design performs as containers of that design travel through one or more distribution chains. The manufacturer may also use the data as feedback for modifying the design of a container. More particularly, the manufacturer may use the information to, for example, strengthen, lighten, or otherwise enhance or optimize container manufacture and/or design. Design improvements and weight changes may be introduced into the float and overall reuse performance can be monitored to determine which changes provide longer life or similar life with reduced weight. This information can be used to optimize the design of the float container over time. The information may also be used to modify the container design for other purposes, for example, to increase speed or accuracy in filling or to track authentic products/containers through their end use or to detect counterfeit products that have entered the distribution chain. The manufacturer may also use at least some of the data received in step 138 for purposes of charging customers for the containers it supplies, and more particularly, for implementing alternative pricing models for the containers. More specifically, in an instance wherein a manufacturer wants to craft a creative and/or unconventional way in which to charge customers for containers (i.e., other than charging a one-time sale price when the containers are ordered or initially supplied), the manufacturer may use at least some of the information received from a customer for purposes of determining revenue or compensation earned by and owed to the manufacturer for the customer's use of the containers. Accordingly, in an embodiment, the method 100 may include one or more steps in addition to or instead of one or more of the previously-described steps that may be used for purposes of monetizing the containers supplied to a customer by the manufacturer.

Figure 5:
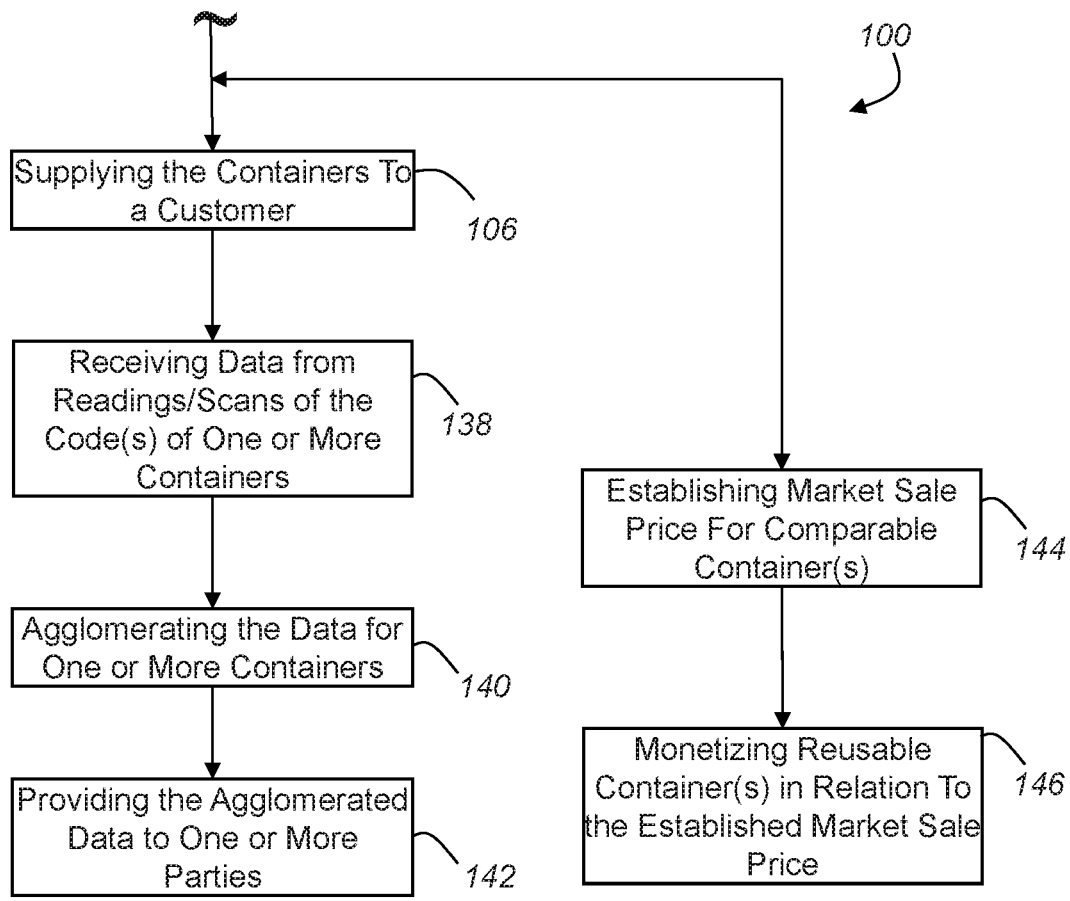

For example, and with reference to the illustrative embodiment shown in FIG. 5, in an instance wherein the containers supplied to the customer in step 106 are reusable containers, the method 100 may include a step 144 of establishing a sale price for containers that are comparable to the reusable containers being supplied in step 106, the established sale price being less than a market (one-time) sale price typically charged for the reusable containers. In an embodiment, step 144 comprises establishing a market sale price for comparable containers that are in a non-reusable form, which are typically less expensive than the market sale price for reusable containers (e.g., by one-half or more, in some instances). Following step 144, method 100 may further include a step 146 of monetizing the reusable containers being supplied in relation to the established market sale price for the non-reusable containers, and doing so in an unconventional manner. Step 146 may take a number of forms including, but certainly not limited to, those described below.

In an illustrative embodiment, step 146 comprises establishing an initial fee for the reusable container(s) that is less than or approximately equal to the market sale price established in step 144 for non-reusable containers, and therefore, less than the market sale price for reusable container(s). Step 146 further includes establishing a per-fill transaction fee to be charged each time the customer refills the supplied container(s). Accordingly, using information received in step 138 from customer-readings of machine-readable codes of containers supplied to the customer in step 106, it can be determined when and/or or how many times the container(s) supplied to the customer have been filled/refilled, and then the manufacturer may then (periodically) charge the customer accordingly (e.g., each time a container is refilled, after a certain number of refills of the container, after a certain total number of refills of a plurality of containers, etc.). Thus, in an embodiment, step 146 comprises selling the reusable containers supplied in step 106 to the customer at an initial price that is below the market sale price established in step 144 and thereafter receiving a per-fill compensation from the customer every time the container(s) is/are refilled by the customer, wherein a sum of the reduced sale price plus a totality of the per-refill compensation may be equal to or greater than the market sale price established in step 144.

By way of example, assume, for purposes of illustration only, the following: the market sale price of a reusable container is $0.40; the market sale price of a comparable, "half-price" non-reusable container established in step 144 is $0.20; the initial fee for a reusable container established in step 146 is $0.20; the per-fill transaction fee established in step 146 is $0.015; and the container is refilled a total of 20 times. Based on this scenario, the total revenue the manufacturer will earn and receive from the customer is $0.50 (i.e., $0.20 (initial fee)+(20*$0.015) (per-fill fee) =$0.50), which is $0.10 more than the $0.40 market sale price of the reusable container.

In another illustrative embodiment, instead of establishing an initial fee for the reusable container(s) in step 146, step 146 includes establishing only a per-fill transaction fee to be charged to the customer each time one of the supplied containers is refilled. This fee may be the same as the per-fill transaction fee established in the pricing model described above or may be different. In any event, using information received in step 138 from customer-readings of machine-readable codes of container(s) supplied to the customer in step 106, it can be determined when and/or or how many times the container(s) supplied to the customer have been refilled, and then the manufacture may (periodically) charge the customer accordingly (e.g., the customer may be charged each time a container is refilled, after a certain number of refills of the container, after a certain total number of refills of a plurality of containers, etc.). Thus, in an embodiment, step 146 comprises not selling the containers supplied in step 106 to the customer, but instead receiving a per-fill/refill compensation from the customer every time the container(s) is/are refilled by the customer, wherein a sum of the totality of the per-fill/refill compensation may be equal to or greater than the market sale price established in step 144.

By way of example, assume for purposes of illustration only that the market sale price of a reusable container is $0.40 and the per-fill transaction fee established in step 146 is $0.03. If a container is refilled 20 times, the total revenue the manufacturer will earn and receive from the customer is $0.60 (i.e., (20*$0.03) (per fill fee)=$0.60), which is $0.20 more than the $0.40 market sale price of the reusable container.

In yet another illustrative embodiment, step 146 comprises establishing a one-time initial fee for the reusable containers that may be more than, less than, or equal to the market sale price established in step 144, and guaranteeing that the containers will withstand at least a predetermined minimum number of refills or reuses. Step 146 may further include establishing a per-fill transaction fee to be charged to the customer for every refill or reuse of a container in excess of the predetermined minimum number of refills or reuses, and determining a pro-rated portion of the initial fee to be returned to the customer if the guaranteed minimum number of refills or reuses is not met. In at least some embodiments, the pro-rated portion that is returned is such that the manufacturer nonetheless receives at least the market sale price determined in step 144, if not more. Accordingly, in an embodiment, step 146 comprises selling the containers supplied to the customer in step 106 at a price that is above, below, or equal to the market sale price established in step 144, and guaranteeing to the customer a minimum quantity of reuses of the container, wherein if the guaranteed minimum quantity is exceeded, the manufacturer earns and receives a per-refill compensation from the bottler every time that container is refilled by the customer in excess of the guaranteed minimum quantity, but wherein if the guaranteed minimum quantity is not met, the manufacturer returns to the customer a pro-rated portion of the initial sale price.

In certain instances, a customer could also be compensated when containers purchased by that customer are filled by another customer, or for filling containers originally purchased or supplied to another customer. For example, containers purchased by multiple customers in a given geographic region may get mixed up as the containers are used, returned, and reused. Since the containers are uniquely identified, in a per-fill transaction wherein a customer fills a container that another customer originally purchased, the per-fill transaction fee may be directed to the customer actually filling the container, and/or the fee could be directed to the customer who originally purchased the container and the customer filling the container may be debited for the transaction fee or at least a pro-rata portion thereof.

In any event, and generally speaking, when the totality of the fees received by the manufacturer in any of the above-described pricing models are tabulated, the total revenue the manufacturer earns and ultimately receives from a customer over the life of a container may be at least equal to each of the market sale price of the reusable container and the market sale price of a non-reusable container established in step 144, and therefore, the manufacturer ultimately may earn more revenue for each reusable container.

It will be appreciated that while certain pricing models for monetizing containers are described in detail above, the present disclosure is not intended to be limited to the use of any particular model(s); rather, any suitable model may be used instead.

It will be further appreciated in view of the foregoing that in addition to providing benefits to the manufacturer (e.g., revenue stream throughout the life of a container, potential for receiving more money for a container than would otherwise be received using conventional approaches, etc.), alternative pricing models such as those described above may also benefit the customers, and therefore, may be an attractive option. More particularly, when a container is purchased for one-time sale price in the usual manner (i.e., when the container is ordered or supplied to the customer), the expense is a capital expense. When purchased using an alternative pricing model like those described above, the expense may no longer be a capital expense but is now an operating or a "cost of goods sold" expense, or the capital expense may be substantially reduced. This frees up capital that can be used by the customer for other purposes. In at least some circumstances, the customer may be permitted to select the way in which they pay for the containers in order to try to maximize their expenditure. Accordingly, the customer may be permitted to choose to expense the sale of the containers on the first fill of the container (a one-time expense), or can choose to capitalize the expense over the life of the container (per-fill arrangement). Additionally, in certain embodiments of method 100, the customer may be provided with the agglomerated data (step 142) only in exchange for partaking in an alternative pricing model, which provides an additional incentive and benefit to the customer. Accordingly, the agglomerated data may be provided to the customer in step 142 in exchange for compensation earned by the manufacturer and, in at least certain instances, received from the customer, in accordance with an established pricing model that may include a per-fill or per-refill compensation.

There thus has been disclosed a system for tracking containers that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method comprising the steps of:
   manufacturing containers, including forming the containers and serializing each of the containers with unique machine-readable codes that are integral to and irremovable from the containers to produce serialized containers;
   using the machine-readable codes to store data associated with the serialized containers, including at least one of a date of container manufacture, a time of container manufacture, production facility data, or container quality data;
   supplying the serialized containers to a customer;
   receiving by a server and from the customer, data obtained from customer-readings of the machine-readable codes by one or more electronic code readers, the data including a quantity of refills of the serialized containers;
   earning revenue from the customer dependent on a pricing model that is determined using the data obtained from customer-readings of the machine-readable codes and that is based at least in part on the quantity of refills of the serialized containers.

2. The method of claim 1, wherein the serialized containers comprise serialized reusable containers, and the method further comprises:
   establishing a market sale price for comparable containers in a non-reusable form otherwise identical to the serialized reusable containers; and
   monetizing the serialized reusable containers in relation to the established market sale price.

3. The method of claim 2, wherein the monetizing step includes selling the serialized reusable containers at an initial sale price that is below the established market sale price, and receiving a per-refill compensation from the customer every time a serialized reusable container is refilled by the customer wherein a sum of the initial sale price plus a totality of the per-refill compensation is greater than the established market sale price.

4. The method of claim 2, wherein the monetizing step includes not selling the serialized reusable containers to the customer and, instead, receiving a per-refill compensation from the customer every time a serialized reusable container is refilled by the customer wherein a sum of the totality of the per-refill compensation is greater than the established market sale price.

5. The method of claim 2, wherein the monetizing step includes selling the serialized reusable containers at an increased sale price that is above the established market sale price, and guaranteeing to the customer a minimum quantity of reuses of the serialized reusable containers, wherein if the guaranteed minimum quantity is exceeded, a manufacturer of the serialized reusable containers receives a per-refill compensation from the customer every time a serialized reusable container is refilled by the customer in excess of the guaranteed minimum quantity, but wherein if the guaranteed minimum quantity is not met, then the manufacturer returns a pro-rated portion of the increased sale price to the customer.

6. The method of claim 1, further comprising:
   associating the data from the customer-readings with the particular container(s) to which the data corresponds; and
   storing the data in an electronic memory device with other data corresponding to the same container(s).

7. The method of claim 1, wherein the data from the customer-readings is received from an electronic scanning device configured to read the machine-readable codes of the containers.

8. The method of claim 1, wherein the data from the customer-readings is received at an electronic processing device that is configured to receive the data.

9. A method comprising the steps of:
manufacturing containers, including forming the containers and serializing the containers with machine-readable codes that are integral to and irremovable from the containers to produce serialized containers;
using the machine-readable codes to store data associated with the serialized containers, including, date of container manufacture, time of container manufacture, production facility data, container quality data, or a combination thereof;
supplying the serialized containers to a customer;
receiving by a server and from the customer, data obtained from customer-readings of the machine-readable codes by one or more electronic code readers, the data including data relating to the filling of the serialized containers by the customer;
receiving by the server and from one or more other locations in a distribution chain in which the serialized containers travel, data obtained from readings of the machine-readable codes at those locations by one or more other electronic code readers;
comparing the data from the customer-readings and other readings of the machine-readable codes across at least one of product brands, product distribution channels, or container types;
receiving from the customer, compensation for the serialized containers in accordance with an established pricing model; and
providing agglomerated data to the customer in exchange for the compensation received from the customer, wherein the agglomerated data includes or is derived from both the data obtained from customer-readings of the machine-readable codes and the data obtained from other readings of the machine-readable codes.

10. The method of claim 9, further comprising:
associating the data from the customer-readings with the particular container(s) to which the data corresponds; and
storing the data in an electronic memory device with other data corresponding to the same container(s).

11. The method of claim 9, wherein the data from the customer-readings is received from an electronic scanning device configured to read the machine-readable codes of the serialized containers.

12. The method of claim 9, wherein the data from the customer-readings is received at an electronic processing device that is configured to receive the data.

13. The method of claim 9, wherein the step of receiving from one or more other locations in a distribution chain in which the containers travel, data obtained from readings of the machine-readable codes at those locations comprises at least one of:
receiving from a seller of products including the serialized containers, data obtained from seller-readings of the machine-readable codes and including at least one of a date of container sale, a time of container sale, or seller-specific data; or
receiving from an end user of the products including the serialized containers, data obtained from end user-readings of the machine-readable codes and including dates of the end user-readings, times of the end user-readings, or both.

14. The method of claim 9, wherein receiving compensation from the customer comprises receiving a per-refill compensation every time a serialized container is refilled by the customer.

15. The method of claim 9, wherein a manufacturer of the serialized containers receives the compensation according to the receiving step.

16. The method of claim 1, wherein a manufacturer of the serialized containers earns the revenue according to the earning step.

* * * * *